A. R. PEFFERS.
BRAKE BEAM.
APPLICATION FILED SEPT. 18, 1913.
1,161,329.
Patented Nov. 23, 1915.
2 SHEETS—SHEET 2.
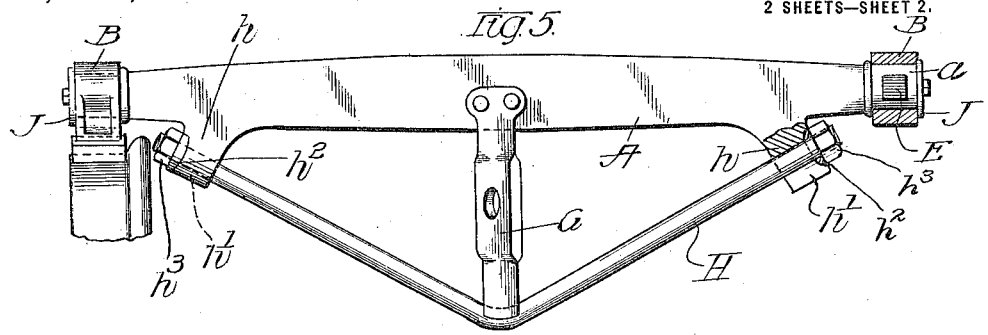
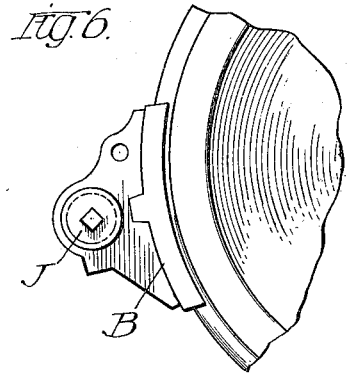
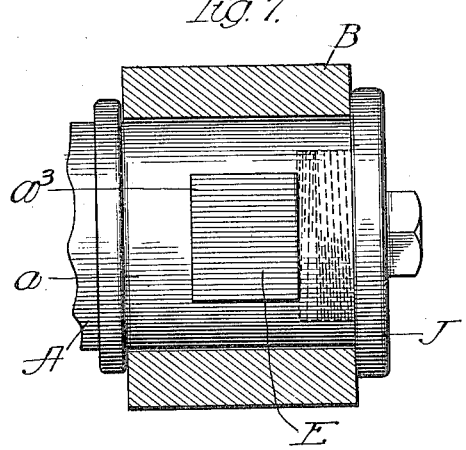
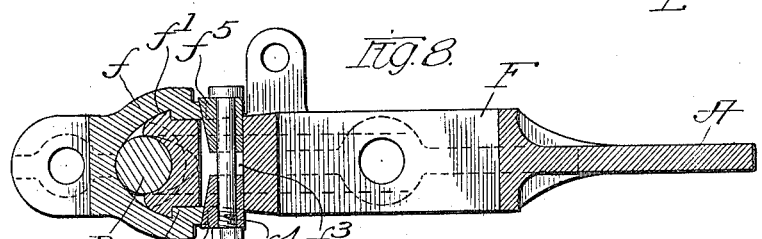
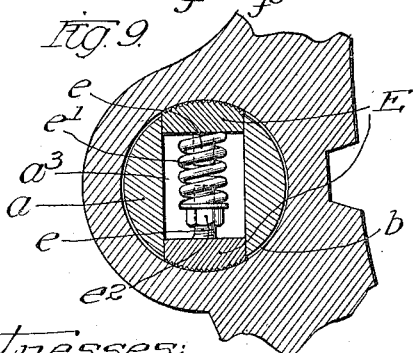
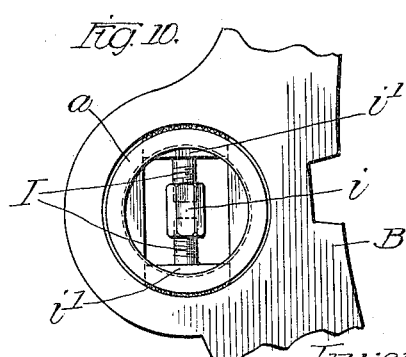

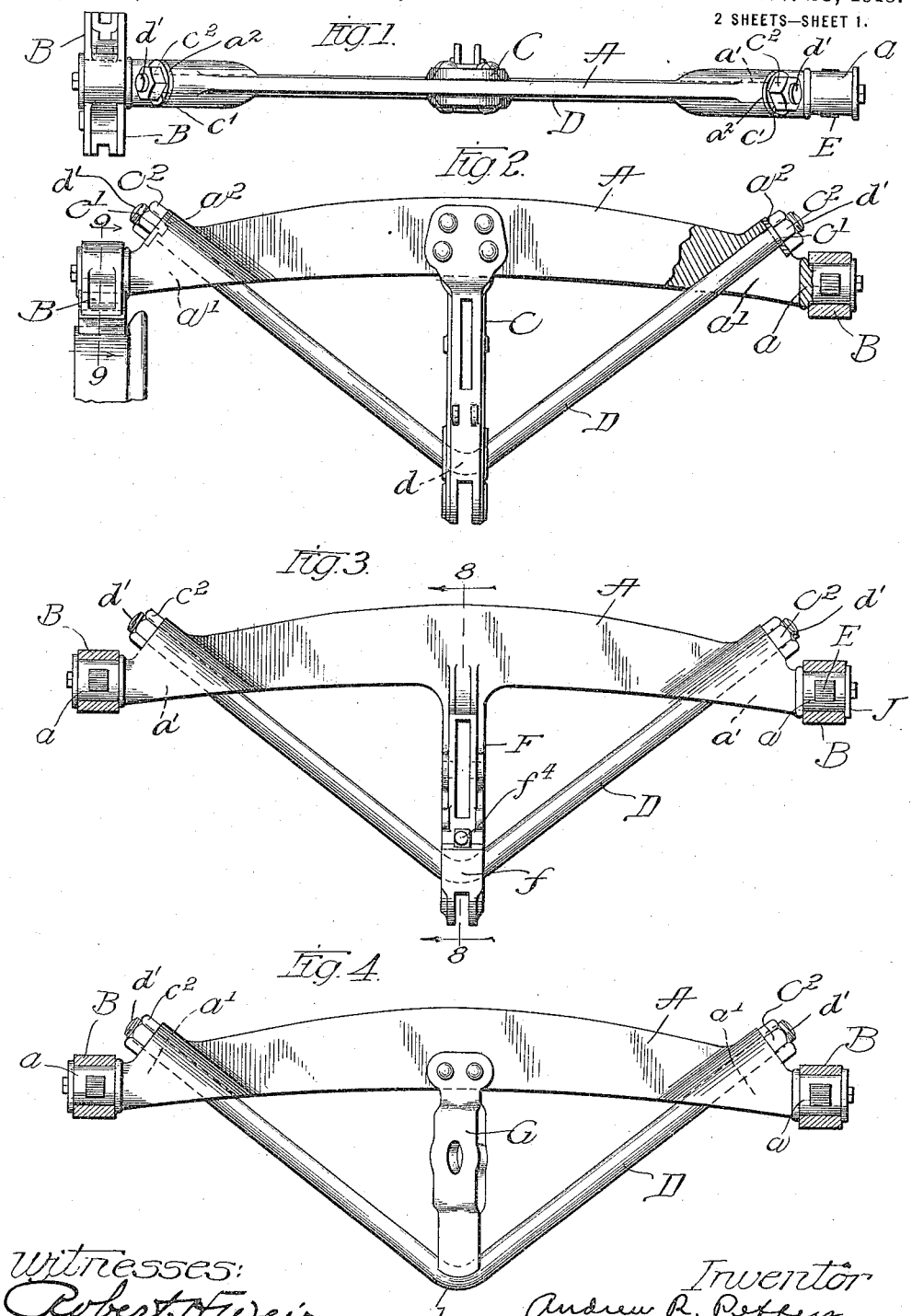

UNITED STATES PATENT OFFICE.

ANDREW R. PEFFERS, OF AURORA, ILLINOIS, ASSIGNOR OF ONE-HALF TO F. C. SCHULTZ, OF CONGRESS PARK, ILLINOIS.

BRAKE-BEAM.

1,161,329.   Specification of Letters Patent.   Patented Nov. 23, 1915.

Application filed September 18, 1913. Serial No. 790,488.

*To all whom it may concern:*

Be it known that I, ANDREW R. PEFFERS, a citizen of the United States of America, and resident of Aurora, Kane county, Illinois, have invented a certain new and useful Improvement in Brake-Beams, of which the following is a specification.

My invention contemplates a brake beam construction in which the compression member is of cast metal, and in which the truss rod is of wrought metal, said rod having its ends adjustably connected to the end portions of the cast metal compression member. In this way, and by casting the compression member, the metal thereof can be distributed in accordance with the strains thereon, and a strong beam of less weight, and more economical to manufacture, is thus produced.

Another object of my invention is to provide novel and improved means for holding the self adjusting brake shoes in position by friction, through the medium of means which move outwardly against the cylindric surface of the hole in the brake shoe head, whereby each shoe will remain in the position in which it leaves the wheel after the brakes are applied.

A further object is to provide a novel and improved form of strut for use in a brake beam of this general character, said strut having a removable connecting member on the end thereof, and means operated by a vertically disposed bolt for causing the said member to tighten or bind on the end of the strut, thus preventing displacement thereof.

Another object is to avoid the use of turnbuckles and other devices which tend to complicate and weaken the construction.

To the foregoing and other useful ends my invention consists in matters hereinafter set forth and claimed.

In the accompanying drawings: Figure 1 is a rear edge view of a brake beam embodying the principles of my invention. Fig. 2 is a plan of the brake beam shown in Fig. 1. Figs. 3, 4 and 5 illustrate different forms of my invention. Fig. 6 is an enlarged side elevation of one of the brake shoes, showing it in position relative to the wheel. Fig. 7 is an enlarged side elevation of one end portion of the brake beam, showing the brake shoe head in section. Fig. 8 is an enlarged section on line 8—8 in Fig. 3. Fig. 9 is an enlarged section on line 9—9, in Fig. 2. Fig. 10 is an end elevation of the mechanism shown in Fig. 9, but showing a slightly different form of my invention.

As thus shown, my invention comprises a compression member A of cast metal, formed with cylindric and fixed end portions $a$ for the self adjusting brake heads B, and having the metal thereof distributed in accordance with the strains thereon. As shown in Figs. 1 and 2, the said member A is formed with recesses $a^1$, immediately inside of the fixed or inseparable portions $a$, and with shoulders $a^2$ disposed at an oblique angle above said recesses. The strut C is connected at $c$ to the center of the member A, and is engaged by the truss rod D, which latter extends through the recesses $a^1$, being perfectly straight between its ends and said strut. As shown, said rod is composed of inseparable middle and end portions $d$ and $d^1$, the two end portions $d^1$ extending at an angle to each other. Washers $c^1$ are interposed between the shoulders $a^2$ and the nuts $c^2$ on the ends of the rod, said washers being preferably interlocked with said shoulders to prevent turning with the nuts. The recesses $a^1$ permit the insertion and removal of the rod D, this beam being what is known as an outside beam, as it is not used between the wheels. The said strut C may be of any suitable character. To assemble the parts, the ends of the rod D are placed opposite the recesses $a^1$, and by then moving the rod toward the beam both ends of the rods are caused to pass through said recesses and to assume the positions shown in Fig. 2. Thus the rod can be inserted and removed regardless of whether or not the brake heads and shoes are in place on the ends of the beam. Also, it is not necessary to spring the rod while it is being inserted or removed.

To hold the brake shoes in place on the portions $a$, each said portion $a$ is provided with a transverse recess $a^3$ (Figs. 7, and 9), in which are located the two members E, provided with stems $e$ for the compression spring $e^1$, one said stem being threaded and provided with a nut for adjusting the tension of said spring. These members E press outwardly against the inner surface of the round hole $b$ in the brake shoe head. Consequently each shoe is held by friction in the position in which it leaves the wheels after the brakes are applied.

As shown in Fig. 3, the construction is the same as previously described, except that the strut F is integral with the compression member A, and has a removable connecting member $f$, shown more clearly in Fig. 8. For this purpose the strut F is provided with shoulders $f^1$, and the member $f$ has opposing shoulders $f^2$, the formation resulting in a sort of dovetail connection. The strut is bored at $f^3$ to receive the bolt $f^4$ and wedges $f^5$, which latter bear against the upper and lower edges of the member $f$, whereby a tightening of said bolt causes said wedges to crowd the shoulders $f^2$ back against the shoulders $f^1$. When the bolt $f^3$ is loosened the member $f$ can then be removed laterally by sliding it along the shoulders $f^1$ on the strut. This member $f$ can be used for making any suitable connection with the brake beam. For this purpose said member may have an eye or opening, as shown, and into this opening any portion of the brake rigging can be inserted to either operate or support the brake beam, depending upon the character of the apparatus and connections employed for the purpose.

As shown in Fig. 4, the construction is substantially like that shown in Fig. 2. The strut G, however, is of a different form, and illustrates the adaptability of my invention to different kinds of brake apparatus.

In Fig. 5 the construction is like that shown in Fig. 4, except that the truss rod H is connected to the forked lugs $h$ on the compression member A, these lugs having recesses $h^1$ for receiving the rod. These lugs have shoulders engaged by the washers $h^2$, and the nuts $h^3$ bear against said washers, when the nuts are tightened on the ends of the rod. This beam is what is known as an inside beam, being adapted for close work between the wheels. Thus it will be seen that the strut may be either integral with or fastened to the cast compression member. But in every case the strut is rigid with said member. In each case the recesses $a^1$ and $h^1$ terminate at the nuts, by which is meant that these recesses do not extend outwardly along the rods any farther than said nuts. This leaves the nuts exposed for easy rotation thereof.

As shown in Fig. 10, the construction is substantially the same as shown in Fig. 9, except that the two stems I are connected by the nut $i$, thus keeping the two members $i^1$, which are the same as the members E, a fixed distance apart.

In each case the brake heads B are held in place by flanged plugs J screwed into the ends of the compression member.

From the foregoing it will be seen that I provide a strong and light brake beam in which are combined a cast metal compression member and a wrought metal truss or tension rod. The said rod is of fixed length and form, being preferably of one integral length of metal, and is perfectly straight between its ends and the strut, in each case, so that the pull on the rod is always direct. No turnbuckle or other devices are necessary for lengthening or shortening the rod. The tension of the rod can be regulated to suit the requirements, by adjusting the nuts on the ends thereof, and in each case the end portions of the rod are received by recesses formed in the compression member, either as shown in Fig. 2 or as shown in Fig. 5, whereby insertion and removal of the rod is made easy and convenient.

The portions $h$ are forked to receive the end portions of the rod laterally, and the recesses $a^1$ serve also to give the beam A a forked or bifurcated formation at the ends thereof. In Figs. 1 to 4, of course, the two prongs of the fork, so to speak, are united by the trunnions or end portions $a$; and inasmuch as the distance between the ends of the rods D is less than the distance between the two portions $a$, it follows that these forks are effective in producing the desired result—that is to say, the convenient insertion and removal of the truss rod. In Fig. 5, however, the two forks or bifurcated portions formed by the recesses $h^1$ have there prongs, so to speak, left free and unconnected at the outer ends thereof. In each form of my invention, as shown, it is also true that the ends of the truss rod are not in alinement with the ends of the compression member. Furthermore, and with the construction shown in Figs. 1 to 5 inclusive, the truss rod forms no part of the means for holding the brake heads in place, and forms no part of the means for holding the trunnions or end portions $a$ in position. The said truss rod is, therefore, removable and insertible while the brake heads are in position on the compression member, the means for holding the brake heads in place being entirely distinct from the means for adjustably and detachably holding the ends of the truss rod in place on the compression member.

The device shown in Figs. 7, 9 and 10 comprising the friction elements E, is claimed in my divisional application Serial No. 32,506, filed June 7, 1915.

What I claim as my invention is:

1. A brake beam provided with a strut, a truss rod engaging said strut, a member adapted for connecting purposes dovetailed on the end of said strut, removable laterally therefrom, a bolt in the strut, and wedges operated by said bolt, engaging said member to hold the same on the strut.

2. A brake beam provided with a strut, a truss rod engaging said strut, a member adapted for connecting purposes dovetailed on the end of said strut, removable laterally therefrom, a bolt in the strut, and wedges operated by said bolt, engaging said member to hold the same in the strut, said wedges operating to crowd the member away from said rod, causing the dovetail connection to bind or tighten.

3. A brake beam provided with a strut, a truss rod engaging said strut, a member adapted for connecting purposes dovetailed in the end of said strut, removable laterally therefrom, a bolt in the strut, and wedges operated by said bolt, engaging said member to hold the same in the strut, said dovetail connection having shoulders which receive the thrust of said member imparted thereto by said wedges.

4. The combination of a cast metal compression member provided with fixed ends, brake shoe heads mounted on the ends of said member, a truss rod of fixed length and form having inseparable middle and end portions, a strut extending between said middle portion of the rod and said member, and external means projecting from the beam for holding the ends of said rod in place on said member, the distance between the ends of said rod being less than the distance between the ends of said member.

5. The combination of a compression member provided with fixed ends, brake shoe heads on said member, a truss rod of fixed length and form having inseparable middle and end portions, a strut between said rod and member, brake shoe heads on said member, and external means projecting from the beam for holding the ends of said rod in place on said member, said rod being insertible and removable while said heads are in position.

6. The combination of a compression member having cast metal ends said ends being inseparable from said member, a truss rod of fixed length and form having inseparable middle and end portions, a strut between said rod and member, brake shoe heads on said ends, and external means projecting from the beam for detachably holding said rod in place on said member, the distance between the ends of said rod being less than the distance between the ends of said member.

7. The combination of a cast metal compression member, brake shoe heads mounted on the ends of said member, a truss rod having inseparable middle and end portions, a strut extending between said rod and member, and external means projecting from the beam for holding the ends of said rod in place on said ends, portions of said member being forked to embrace the ends of said rod, and the sides of each fork being disposed in parallel planes at opposite sides of the plane of said rod.

8. The combination of a brake beam compression member, brake shoe heads on said member, a truss rod, of fixed length and form having inseparable middle and end portions, a strut between said rod and member, and external means projecting from the beam for holding the ends of said rod in place on said member in the plane of the axis of the brake beam, said rod being insertible and removable while said heads are in position without bending the rod, portions of said member being forked to embrace the ends of said rod, and the sides of each fork being disposed in parallel planes at opposite sides of the plane of said rod.

9. The combination of a brake beam compression member having cast metal ends, a truss rod of fixed length and form having inseparable middle and end portions, a strut between said rod and member, brake shoe heads on said ends, and external means projecting from the beam for holding said rod in place on said ends in the plane of the axis of the brake beam, portions of said ends being forked to embrace the ends of said rod, and the sides of each fork being parallel and at opposite sides of said plane, said means including nuts screwed on to the ends of the rod, and each said nut being disposed in position for adjustment to tension said rod.

10. The combination of a brake beam cast metal compression member, brake shoe heads mounted on the ends of said member, a truss rod of fixed length and form having inseparable middle and end portions, a strut extending between said rod and member, and external means projecting from the beam for holding the ends of said rod in place on said member in the plane of the axis of the brake beam, portions of said member being forked to embrace the ends of said rod, and the sides of each fork being parallel and at opposite sides of said plane of said rod, each fork being shaped to provide a thrust bearing for resisting the pull of said rod.

11. The combination of a brake beam compression member, brake shoe heads on said member, a truss rod of fixed length and form having inseparable middle and end portions, a strut between said rod and member, brake shoe heads on said member, and external means projecting from the beam for holding the ends of said rod in place on said member in the plane of the axis of the brake beam, said rod being insertible and removable while said heads are in position without bending the rod, portions of said member being forked to embrace the ends of said rod, and the sides of each fork being parallel and at opposite sides of said plane, each fork being shaped to provide a thrust bearing for resisting the pull of said rod.

12. The combination of a brake beam compression member having cast metal ends, a truss rod of fixed length and form having inseparable middle and end portions, a strut between said rod and member, brake shoe heads on said ends, and external means projecting from the beam for holding said rod in place on said ends in the plane of the axis of the brake beam, integral portions of said ends being forked to embrace the ends of said rod, and the sides of each fork being parallel and at opposite sides of said plane, each fork being shaped to provide a thrust bearing for resisting the pull of said rod.

13. The combination of a cast metal compression member, brake shoe heads mounted on the ends of said member, devices for holding said heads against displacement from said member a truss rod having inseparable middle and end portions, a strut extending between said rod and member, and external means projecting from the beam for holding the ends of said rod in place on said member, each brake shoe head being mounted for self adjustment about an axis extending longitudinally of said member, and said rod being disposed throughout the length thereof in the plane of said axis.

14. The combination of a compression member, brake shoe heads on said member, a truss rod of fixed length and form having inseparable middle and end portions, a strut between said rod and member, and external means projecting from the beam for holding the ends of said rod in place on said member, said rod being insertible and removable while said heads are in position, each brake shoe head being mounted for self adjustment about an axis extending longitudinally of said member, and said rod being disposed throughout the length thereof in the plane of said axis.

15. The combination of a compression member having fixed or inseparable cast metal ends, a truss rod of fixed length and form having inseparable middle and end portions, a strut between said rod and member, having provisions for making connection thereto, brake shoe heads on said ends, devices for holding said heads against displacement from said member and external means projecting from the beam for holding said rod in place on said member, each brake shoe head being mounted for self adjustment about an axis extending longitudinally of said member, and said rod being disposed throughout the length thereof in the plane of said axis.

16. A brake beam comprising a compression member provided with cast metal end portions for supporting brake heads, a bent truss rod composed of one integral length of metal, a strut between said rod and member, and nuts on the ends of said rod for regulating the tension thereof, said portions being formed with laterally projecting thrust bearings for supporting said nuts in position for adjustment thereof, said bearings having recesses for permitting insertion and removal of said rod bodily in the direction of the length of said strut, without bending the rod and said rod being disposed throughout the length thereof in the plane of said member.

17. A brake beam comprising a compression member provided with cast metal end portions for supporting brake heads, a bent truss rod composed of one integral length of metal, a strut between said rod and member, and nuts on the ends of said rod for regulating the tension thereof, said portions being formed with laterally projecting thrust bearings for supporting said nuts in position for adjustment thereof, said bearings having recesses for permitting insertion and removal of said rod bodily in the direction of the length of said strut, without bending the rod and said rod being disposed throughout the length thereof in the plane of said member, said member being cast integral with said end portions and bearings, and said recesses terminating at said nuts.

18. A brake beam comprising a compression member provided with cast metal end portions for supporting brake heads, a bent truss rod composed of one integral length of metal, a strut between said rod and member, and nuts on the ends of said rod for regulating the tension thereof, said portions being formed with laterally projecting thrust bearings for supporting said nuts in position for adjustment thereof, said bearings having recesses for permitting insertion and removal of said rod bodily in the direction of the length of said strut, without bending the rod and said rod being disposed throughout the length thereof in the plane of said member, said end portions having cylindric trunnions for the brake heads, and the axis of said trunnions being disposed in said plane.

19. A brake beam comprising a compression member provided with cast metal end portions for supporting brake heads, a strut extending from said member, a truss rod, and heads screwed on the ends of said rod, said end portions having means to engage and disengage said rod while the brake heads are in position, said means having thrust bearings forming seat for said rod heads, said rod and heads thereof being disposed in the plane of the axis of said beam, and said rod heads being accessible for adjustment to regulate the tension of said rod, without disturbing the brake heads, said strut engaging said rod.

Signed by me at Chicago, Illinois, this 4th day of September, 1913.

ANDREW R. PEFFERS.

Witnesses:
RACHEL J. RICHARDSON,
ROSE E. SCHNEM.

Copies of this patent may be obtained for five cents each, by addressing the "Commissioner of Patents, Washington, D. C."